(12) United States Patent
Sell

(10) Patent No.: US 12,285,021 B2
(45) Date of Patent: Apr. 29, 2025

(54) TENDON EXTRACTION DEVICE AND RELATED TECHNIQUES

(71) Applicant: Katherine Sottung, Haverhill, MA (US)

(72) Inventor: Forrest Sell, Epsom, NH (US)

(*) Notice: Subject to any disclaimer, the term of this patent is extended or adjusted under 35 U.S.C. 154(b) by 0 days.

(21) Appl. No.: 18/121,818

(22) Filed: Mar. 15, 2023

(65) Prior Publication Data
US 2023/0292774 A1 Sep. 21, 2023

Related U.S. Application Data

(60) Provisional application No. 63/321,529, filed on Mar. 18, 2022, provisional application No. 63/331,999, filed on Apr. 18, 2022.

(51) Int. Cl.
*A22C 21/00* (2006.01)
*A22C 21/06* (2006.01)

(52) U.S. Cl.
CPC .................. *A22C 21/066* (2013.01)

(58) Field of Classification Search
CPC ........ A22B 3/10; A22B 5/0047; A22C 21/066
USPC ................. 452/102, 103, 166, 172
See application file for complete search history.

(56) References Cited

U.S. PATENT DOCUMENTS

| 941,759 | A | * | 11/1909 | Congdon | A22C 21/066 |
|---|---|---|---|---|---|
| | | | | | 452/172 |
| 1,338,452 | A | * | 4/1920 | Hunsinger, Sr. | A22C 21/066 |
| | | | | | 452/172 |
| 1,601,077 | A | * | 9/1926 | MacDonald | A22C 21/066 |
| | | | | | 452/172 |
| 2,068,137 | A | * | 1/1937 | Jaeger | A22C 21/066 |
| | | | | | 452/172 |
| 2,258,884 | A | * | 10/1941 | Duffy, Sr. | A22C 21/066 |
| | | | | | 452/172 |
| 2,278,162 | A | * | 3/1942 | Couriang | A22C 21/066 |
| | | | | | 452/172 |
| 2,382,320 | A | * | 8/1945 | Jenson | A22C 21/066 |
| | | | | | 452/172 |
| 2,425,077 | A | * | 8/1947 | Alexander | A22C 21/066 |
| | | | | | 452/172 |

(Continued)

FOREIGN PATENT DOCUMENTS

| CN | 111802433 A | 10/2020 |
|---|---|---|
| CN | 113347885 A | 9/2021 |
| JP | 2020054260 A | 4/2020 |

*Primary Examiner* — David J Parsley
(74) *Attorney, Agent, or Firm* — Hayes Soloway PC

(57) ABSTRACT

A tendon extraction device is disclosed. The device may include a gripping portion and an extracting portion. The gripping portion may be configured, in accordance with some embodiments, to securely grip a tendon of a piece or cut of raw meat. The extracting portion may be configured, in accordance with some embodiments, to extract (e.g., by cutting or stripping away) the tendon from the raw meat. Thus, a user may use the device to remove tendon(s) prior to cooking the meat in an easy and efficient manner. In some embodiments, the gripping portion and the extracting portion optionally may be configured to interface with one another (e.g., for ease of storage and retrieval). To that end, the gripping portion and the extracting portion may be interfaced via a snap-fit connection, in accordance with some embodiments.

20 Claims, 5 Drawing Sheets

(56) References Cited

U.S. PATENT DOCUMENTS

| | | | | |
|---|---|---|---|---|
| 2,653,346 | A | * | 9/1953 | Ograbisz .............. A22C 21/066 452/172 |
| 2,669,748 | A | * | 2/1954 | Ine ....................... A22C 21/066 452/172 |
| 2,689,371 | A | * | 9/1954 | MacDonald ......... A22C 21/066 452/172 |
| 2,690,588 | A | * | 10/1954 | Hillsen, Sr. .......... A22C 21/066 452/172 |
| 5,038,475 | A | * | 8/1991 | Wolff .................... A61J 7/0007 225/103 |
| 5,133,688 | A | | 7/1992 | Hutchinson |
| 5,234,372 | A | * | 8/1993 | Hutchison ............ A22B 5/0017 426/272 |
| 2021/0169092 | A1 | | 6/2021 | Gray |

* cited by examiner

TENDON EXTRACTION DEVICE AND RELATED TECHNIQUES

CROSS-REFERENCE TO RELATED APPLICATIONS

This patent application claims the benefit of U.S. Provisional Patent Application No. 63/321,529, titled "Tendon Extraction Device and Related Techniques," filed on Mar. 18, 2022, and U.S. Provisional Patent Application No. 63/331,999, titled "Tendon Extraction Device and Related Techniques," filed on Apr. 18, 2022. Each of these patent applications is herein incorporated by reference in its entirety.

FIELD OF THE DISCLOSURE

The present disclosure relates to raw meat processing and, more particularly, to extraction of tendons from a piece or cut of raw meat such as raw poultry tenderloins.

SUMMARY

The subject matter of this application may involve, in some cases, interrelated products, alternative solutions to a particular problem, and/or a plurality of different uses of a single system or article.

One example embodiment provides a tendon extraction device. The tendon extraction device includes a gripping portion configured to grip an exposed tendon of a piece of raw meat. The gripping portion includes a first body portion. The gripping portion also includes a first arm portion extending from the first body portion. The gripping portion also includes a second arm portion extending from the first body portion adjacent the first arm portion. At least one of the first arm portion and the second arm portion has a toothed region configured to contact the exposed tendon in operation of the gripping portion. The tendon extraction device also includes an extracting portion configured to extract the exposed tendon from the piece of raw meat. The extracting portion includes a second body portion. The extracting portion also includes a third arm portion extending from the second body portion. The extracting portion also includes a fourth arm portion extending from the second body portion adjacent the third arm portion. At least one of the third arm portion and the fourth arm portion has a cutting feature configured to contact the exposed tendon to effectuate separation of the exposed tendon from surrounding tissue of the piece of raw meat in operation of the extracting portion.

In some cases, the toothed region is disposed at an end of the at least one of the first arm portion and the second arm portion which is distal to the first body portion. In some cases, the first arm portion and the second arm portion have respective toothed regions. In some such instances, the respective toothed regions are disposed at respective ends of the first arm portion and the second arm portion. In some other such instances, the respective toothed regions of the first arm portion and the second arm portion are configured to interface with one another in a complementary manner.

In some cases, the first arm portion and the second arm portion are substantially parallel to one another. In some cases, the first arm portion and the second arm portion have respective pressing pads configured to have pressure applied thereto in operation of the gripping portion. In some such instances, the respective pressing pads are disposed at respective ends of the first arm portion and the second arm portion.

In some cases, the third arm portion and the fourth arm portion are substantially parallel to one another. In some cases, the cutting feature extends along at least a partial length of the at least one of the third arm portion and the fourth arm portion. In some cases, the third arm portion and the fourth arm portion have respective cutting features. In some such instances, the respective cutting features extend along at least a partial length of the third arm portion and the fourth arm portion, respectively. In some other such instances, the respective cutting features of the third arm portion and the fourth arm portion have a generally triangular prism shape of substantially triangular cross-sectional geometry. In some other such instances, the respective cutting features of the third arm portion and the fourth arm portion are chamfered at respective ends thereof.

In some cases, at least one of the gripping portion and the extracting portion is configured to be held in a hand of a user of the tendon extraction device. In some instances, the gripping portion is configured to be held in a first hand of the user, and the extracting portion is configured to be held in a second hand of the user.

In some cases, the gripping portion and the extracting portion are configured to interface with one another in joined fashion when the tendon extraction device is not in use. In some such instances, the gripping portion and the extracting portion are configured to interface with one another via snap-fit assembly thereof. In some such instances, for providing such snap-fit assembly: the gripping portion includes at least one tab feature; and the extracting portion includes at least one receiver feature configured to receive and retain the at least one tab feature of the gripping portion.

In some cases, the piece of raw meat comprises a portion of a chicken breast. In some such instances, the portion of the chicken breast comprises a chicken tenderloin. In some cases, the exposed tendon is of an inner pectoral muscle of a chicken.

The features and advantages described herein are not all-inclusive and, in particular, many additional features and advantages will be apparent to one of ordinary skill in the art in view of the drawings, specification, and claims. Moreover, it should be noted that the language used in the specification has been selected principally for readability and instructional purposes and not to limit the scope of the inventive subject matter.

Figure 1:
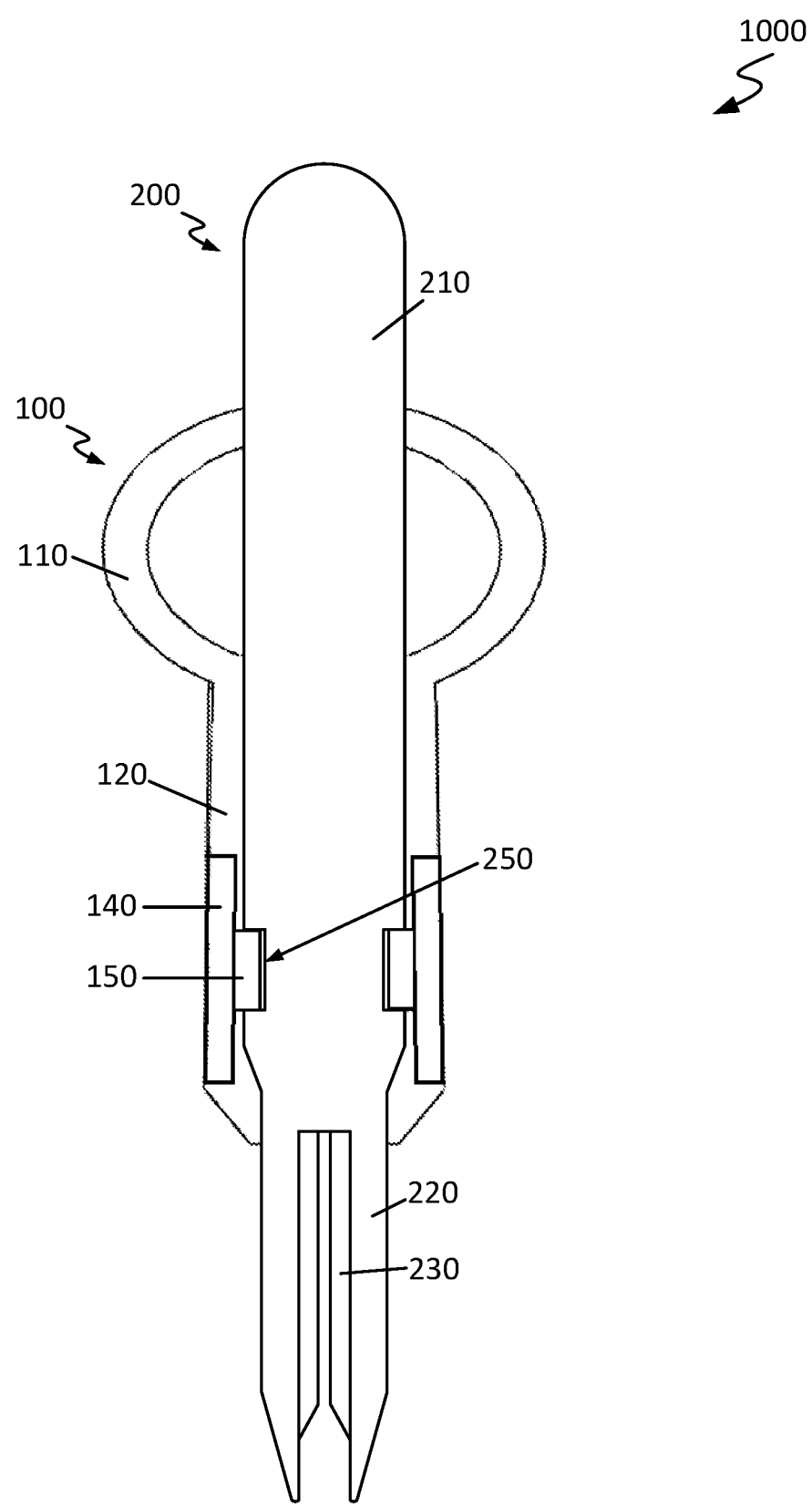
FIG. 1 illustrates a tendon extraction device configured in accordance with an embodiment of the present disclosure.

These and other features of the present embodiments will be understood better by reading the following detailed description, taken together with the figures herein described. In the drawings, each identical or nearly identical component that is illustrated in various figures may be represented by a like numeral. For purposes of clarity, not every component may be labeled in every drawing. Furthermore, as will be appreciated in light of this disclosure, the accompanying drawings are not intended to be drawn to scale or to limit the described embodiments to the specific configurations shown.

DETAILED DESCRIPTION

A tendon extraction device is disclosed. The device may include a gripping portion and an extracting portion. The gripping portion may be configured, in accordance with some embodiments, to securely grip a tendon of a piece or cut of raw meat. The extracting portion may be configured, in accordance with some embodiments, to extract (e.g., by cutting or stripping away) the tendon from the raw meat. Thus, a user may use the device to remove tendon(s) prior to cooking the meat in an easy and efficient manner. In some embodiments, the gripping portion and the extracting portion optionally may be configured to interface with one another (e.g., for ease of storage and retrieval). To that end, the gripping portion and the extracting portion may be interfaced via a snap-fit connection, in accordance with some embodiments. Numerous configurations and variations will be apparent in light of this disclosure.

General Overview

In accordance with some embodiments of the present disclosure, a tendon extraction device is disclosed. The device may include a gripping portion and an extracting portion. The gripping portion may be configured, in accordance with some embodiments, to securely grip a tendon of a piece or cut of raw meat. The extracting portion may be configured, in accordance with some embodiments, to extract (e.g., by cutting or stripping away) the tendon from the raw meat. Thus, a user may use the device to remove tendon(s) prior to cooking the meat in an easy and efficient manner. In some embodiments, the gripping portion and the extracting portion optionally may be configured to interface with one another (e.g., for ease of storage and retrieval). To that end, the gripping portion and the extracting portion may be interfaced via a snap-fit connection, in accordance with some embodiments.

In accordance with some embodiments, the disclosed device may be used, for example, in removing tendons from cuts or pieces of poultry (e.g., chicken, turkey, duck, quail, pheasant, partridge, etc.), such as tenderloins. As will be appreciated in light of this disclosure, however, the disclosed device is not intended to be so limited in use, as in a more general sense, the device may be used in removing tendons from any of a wide range of raw meat types, in accordance with various embodiments.

Structure and Operation

FIG. 1 illustrates a tendon extraction device 1000 configured in accordance with an embodiment of the present disclosure. As can be seen, tendon extraction device 1000 (hereinafter, device 1000) may be configured as a two-piece system or assembly that includes (i) a gripping portion 100 and (ii) an extracting portion 200, each discussed in turn below. Gripping portion 100 may be configured to securely grip a tendon of a piece or cut of raw meat, and extracting portion 200 may be configured to extract (e.g., by cutting or stripping away) the tendon from the raw meat. More generally, extracting portion 200 may be configured to effectuate separation of an exposed tendon from surrounding tissue of the piece of raw meat, while gripping portion 100 may be configured to hold and/or maneuver the exposed tendon in the process of extraction.

As will be appreciated in light of this disclosure, device 1000 may be utilized for extracting tendons from any of a wide range of types of raw meat. For instance, device 1000 may be utilized, in accordance with some embodiments, for extracting tendons from chicken tenderloins (i.e., the inner pectoral muscle that lies along the breastbone of a chicken), though numerous other suitable uses for device 1000 will be apparent in light of this disclosure.

FIGS. 2-6 illustrate a gripping portion 100 configured in accordance with an embodiment of the present disclosure. As can be seen, gripping portion 100 may include a body portion 110. As generally shown in FIGS. 2-6, body portion 110 may be formed, for example, as a right tubular cylinder (e.g., having two opposing planar flat surfaces) of generally open-curved geometry, having a substantially semi-elliptical or semi-circular shape, in accordance with some embodiments. It should be noted, however, that the present disclosure is not intended to be so limited, as in a more general sense, the geometry and dimensions of body portion 110 may be customized, as desired. For instance, in accordance with some other embodiments, body portion 110 may have a substantially semi-rectangular, semi-square, or other semi-polygonal shape. Numerous suitable shapes for body portion 110 will be apparent in light of this disclosure.

Figure 2:
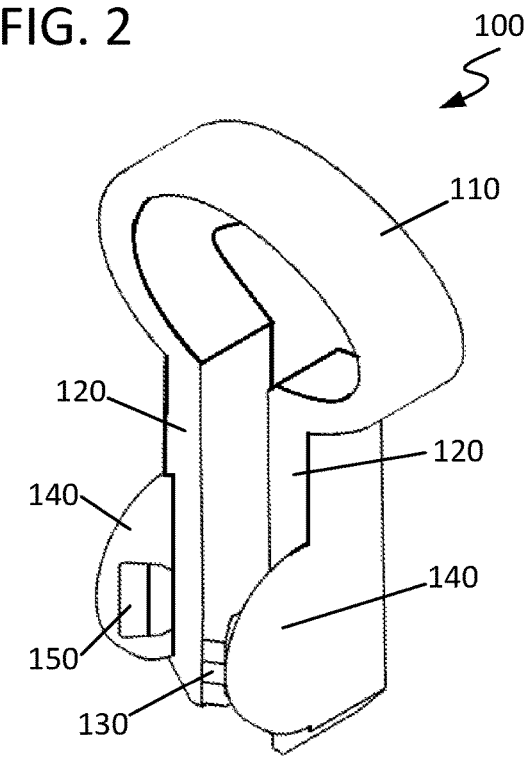
FIGS. 2-6 illustrate a gripping portion configured in accordance with an embodiment of the present disclosure.
Figure 3:
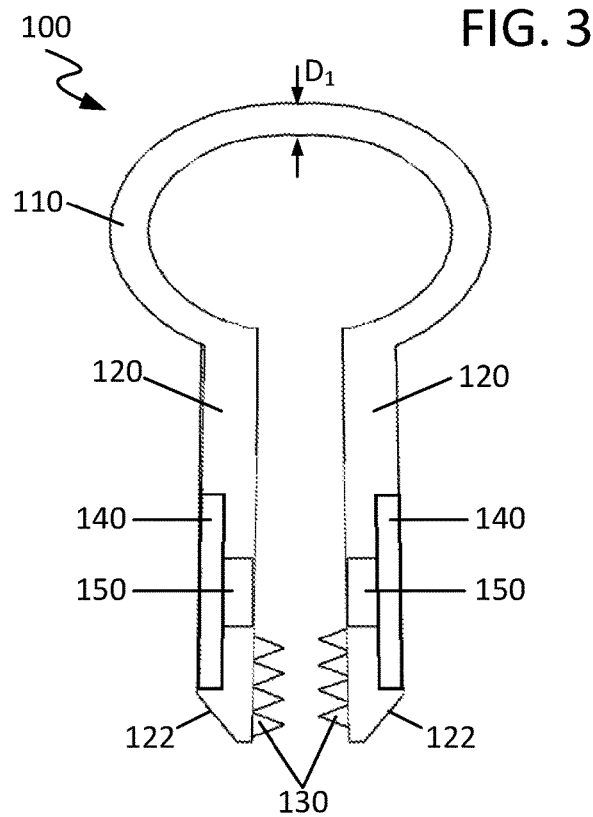
Figure 4:
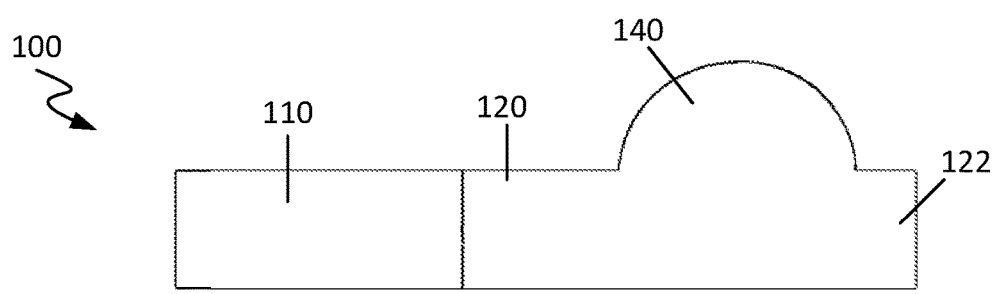
Figure 5:
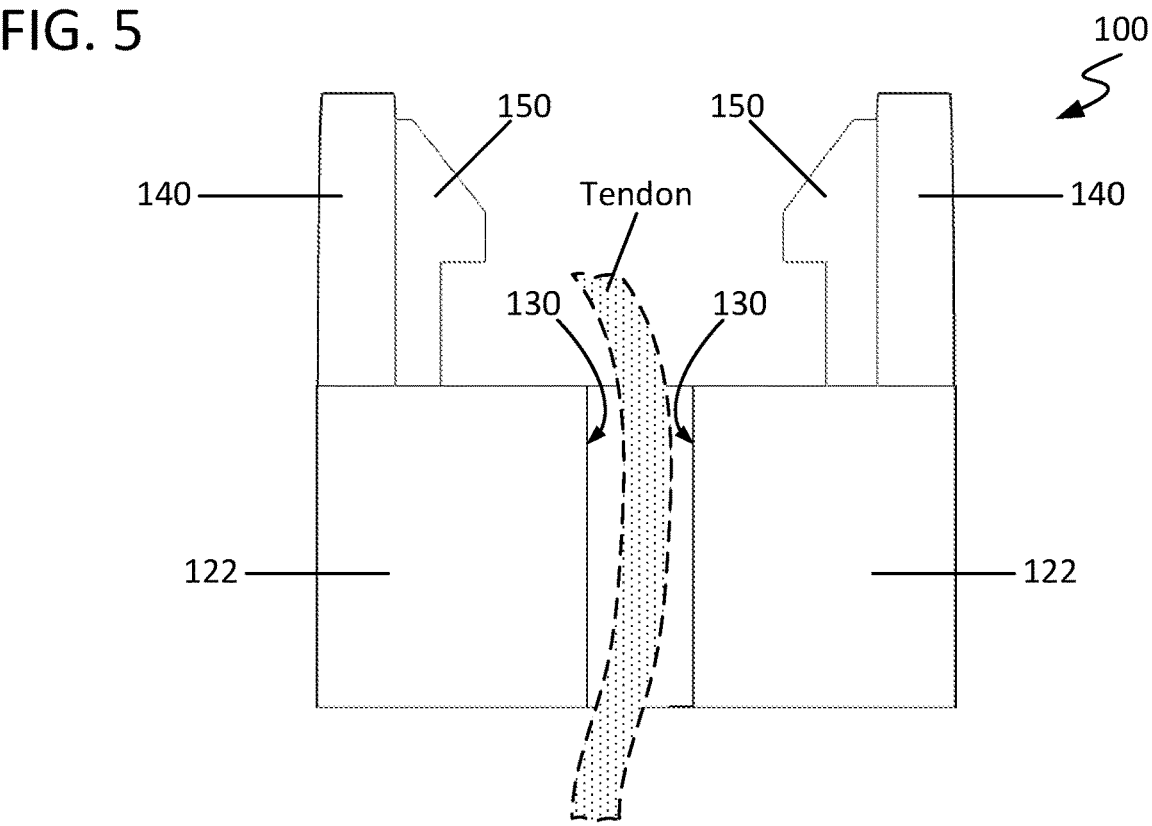
Figure 6:
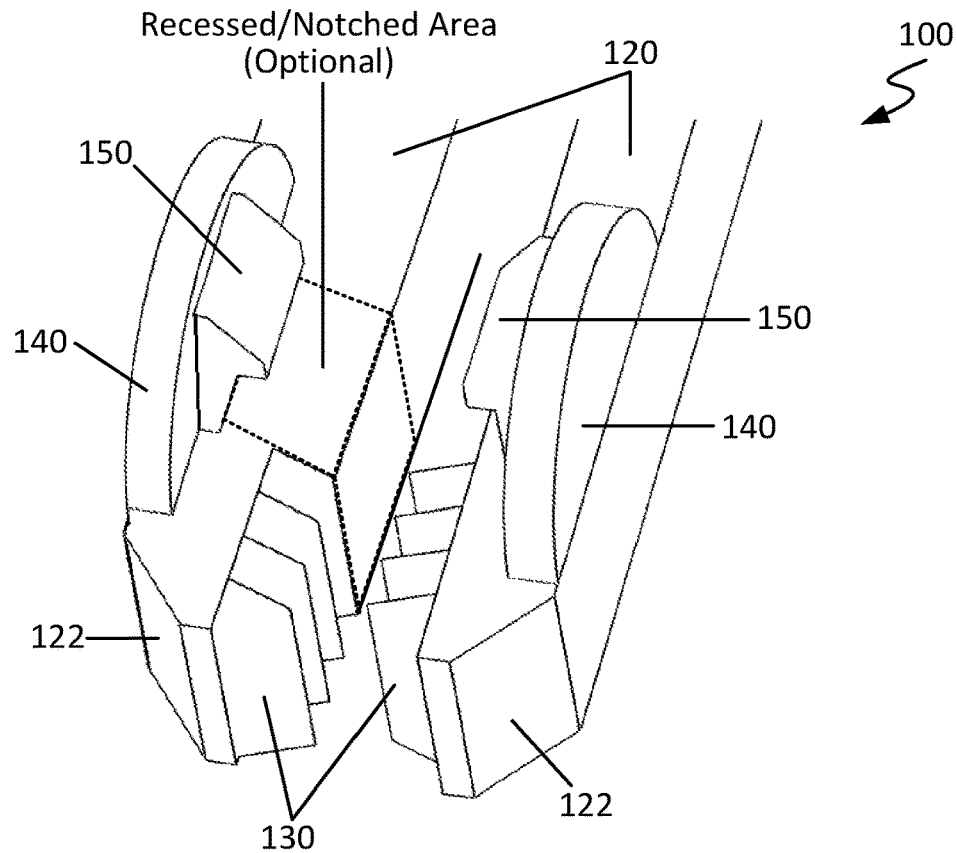
Figure 7:
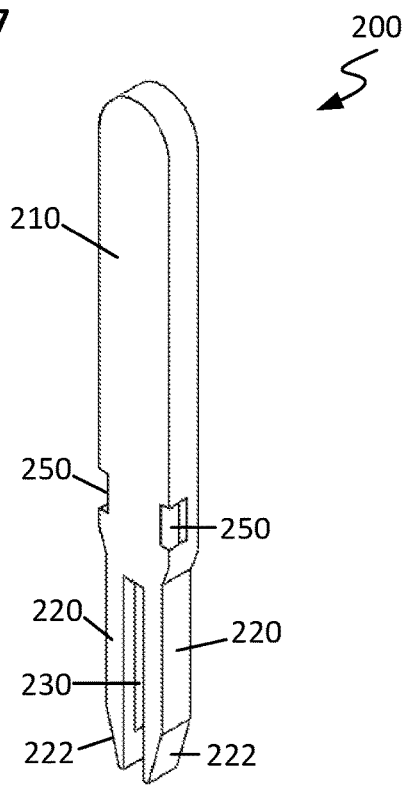
FIGS. 7-11 illustrate an extracting portion configured in accordance with an embodiment of the present disclosure.

Also, as can be seen from FIGS. 2-3, body portion 110 may be generally annular (e.g., ring-like) in form. In providing such form, the sidewall thickness (dimension $D_1$—see FIG. 3) of body portion 110 may be customized, as desired. As will be appreciated in light of this disclosure, it generally may be desirable to ensure that the sidewall thickness $D_1$ of body portion 110 is commensurate with a target degree of resilience and manipulability for gripping portion 100 (i.e., the sidewall is not so thick as to inhibit flexing and not so thin as to be fragile).

As can be seen further from FIGS. 2-6, gripping portion 100 also may include two arm portions 120 that extend from body portion 110. Arm portions 120 may extend from body portion 110 generally parallel to one another (e.g., within about 10° or less of divergence of one another in extending away from body portion 110), in accordance with some embodiments. Also, as can be seen from FIGS. 2-6, the end 122 (e.g., distal to body portion 110) of each arm portion 120 optionally may be chamfered to a given degree, in accordance with some embodiments. The angle of chamfering, when optionally included, may be customized, as desired. Alternatively (or additionally), end 122 may be provided with a given degree of rounding and/or faceting.

The geometry and dimensions of arm portions 120 may be customized, as desired. In accordance with some embodiments, a given arm portion 120 may be substantially linear (e.g., straight) in form. In some other embodiments, a given arm portion 120 may be substantially non-linear (e.g., curved and/or articulated) in form. In some cases, a given arm portion 120 may have a generally box-like shape of substantially square or rectangular cross-sectional geometry. In some other cases, a given arm portion 120 may have a generally cylindrical shape of substantially circular or elliptical cross-sectional geometry. In some cases, a given arm portion 120 may be substantially uniform in one or more dimensions along its length, whereas in some other cases, a given arm portion 120 may change in one or more dimensions along its length (e.g., may taper or expand in one or more directions).

The relative positioning of arm portions 120 on or about body portion 110 may be customized, as desired. For instance, in some cases, a given arm portion 120 may be disposed at each end of the open-curved shape of body portion 110. In some instances, a first terminus of body portion 110 may transition directly to a first arm portion 120, while a second terminus of body portion 110 may transition directly to a second arm portion 120, as generally can be seen in FIG. 3. In some other instances, however, a given arm portion 120 may be located along body portion 110 some distance before reaching a terminus of body portion 110, thereby leaving some portion of body portion 110 to continue extending further beyond the junction of that arm portion 120 and body portion 110. The amount of any such extension, when optionally included, may be customized, as desired.

In accordance with some embodiments, each arm portion 120 further may include a toothed region 130 (e.g., at or near an end 122 of arm portion 120 distal to body portion 110). The quantity and arrangement (e.g., pitch or spacing) of constituent teeth of a given toothed region 130 may be customized, as desired. As can be seen from FIGS. 2-6, for example, each toothed region 130 may include four teeth. It should be noted, however, that the present disclosure is not intended to be so limited, as lesser quantities (e.g., none, one, two, or three) or greater quantities (e.g., five, six, or more) of teeth may be provided for a given toothed region 130, in accordance with other embodiments.

In accordance with some embodiments, arm portions 120 may include corresponding toothed regions 130 that are configured to interface with one another in a substantially complementary manner. To that end, the toothed region 130 of one arm portion 120 may be offset from the toothed region 130 of the other arm portion 120 such that (A) the convexity of a given tooth on one arm portion 120 fits into (B) the concavity between teeth (or otherwise adjacent a single tooth) on the other arm portion 120. Thus, the vertex of one tooth may fit into the recess between two other teeth (or adjacent an end tooth). Toothed regions 130 may be configured, in accordance with some embodiments, to aid gripping portion 110 in clamping down on a tendon.

In some cases, the constituent teeth of a given toothed region 130 may be substantially homogeneous in configuration. That is, all constituent teeth of a given toothed region 130 may be substantially similar (e.g., identical or approximately identical) in configuration. In some other cases, the constituent teeth of a given toothed region 130 may be heterogeneous in configuration. That is, at least one constituent tooth of a given toothed region 130 may differ substantially from at least one other constituent tooth thereof in one or more characteristics (e.g., geometry, contour, size, surface texture, faceting, etc.).

In accordance with some other embodiments, rather than having both arm portions 120 including respective toothed regions 130 (e.g., as generally shown in FIG. 3), (A) one arm portion 120 may include a toothed region 130, while (B) the other arm portion 120 may include one or more recesses or cavities formed therein which are configured to receive all (or some sub-set) of the constituent teeth of such toothed region 130. In such cases, a given tooth (on one arm portion 120) may be insertable into a given recess or cavity (in the other arm portion 120) in mated engagement. In some embodiments, each arm portion 120 may include (A) one or more teeth as well as (B) one or more recesses/cavities, such that each arm portion 120 has mated engagement with the other arm portion 120, in a mutual manner.

In accordance with some embodiments, each arm portion 120 optionally may include a pressing pad 140. Pressing pads 140 may be configured to have pressure applied thereto to facilitate inward deflection of arm portions 120. In some instances, a user may apply pressure manually. In some other instances, pressure may be applied via a tool, mechanism, or machine. In any case, applying pressure at pressing pads 140 may cause arm portions 120 to move toward one another in the gap therebetween. In some cases, a given pressing pad 140 may be provided near the end 122 (e.g., distal to body portion 110) of a given arm portion 120. In some cases, a given pressing pad 140 may be provided along an edge of its corresponding arm portion 120 (e.g., adjacent the longitudinal extent of such arm portion 120). In accordance with some embodiments, pressing pads 140 may be arranged substantially opposite one another across the gap between arm portions 120 and may be generally parallel to one another (or at least as parallel as arm portions 120 may be).

The dimensions and geometry of a given pressing pad 140 may be customized, as desired. In some example cases, a given pressing pad 140 may be generally semi-circular or semi-elliptical in shape. In some other example cases, a given pressing pad 140 may be generally square or rectangular in shape. In some other example cases, a given pressing pad 140 may be generally triangular, hexagonal, or otherwise polygonal in shape. Numerous suitable shapes for pressing pads 140 will be apparent in light of this disclosure.

As noted above, gripping portion 100 may be configured to grip a tendon securely. To that end, gripping portion 100 may be configured such that pressure may be applied to arm portions 120 to deflect them inward toward one another, thereby causing arm portions 120 to converge to apply gripping pressure to a tendon situated therebetween. In cases where one or more toothed regions 130 are provided, such feature(s) may contact the tendon (e.g., directly or indirectly through one or more intervening features) to facilitate the gripping action. The inward deflection of arm portions 120 generally may be temporary, lasting so long as sufficient pressure is applied (e.g., at optional pressing pads 140 or otherwise) or, in cases where gripping portion 100 is configured to be locked in a deflected state, until such locked state is ceased (e.g., arm portions 120 are unlocked). When the applied pressure ceases, arm portions 120 naturally may return to their undeflected state, causing arm portions 120 to separate from one another (e.g., causing one or more toothed regions 130 to disengage), thereby releasing the grip on the tendon.

FIGS. 7-11 illustrate an extracting portion 200 configured in accordance with an embodiment of the present disclosure. As can be seen, extracting portion 200 may include a body portion 210. As generally shown in FIGS. 7-11, body portion 210 may be formed, for example, as an elongate right elliptical cylinder (e.g., having two opposing planar flat surfaces), in accordance with some embodiments. It should be noted, however, that the present disclosure is not intended to be so limited, as in a more general sense, the geometry and dimensions of body portion 210 may be customized, as desired. For instance, in accordance with some other embodiments, body portion 210 may have a substantially rectangular (e.g., box-like) or other polygonal shape. In some cases, body portion 210 may be at least partially rounded or curved. As will be appreciated in light of this disclosure, it may be desirable, at least in some instances, to ensure that body portion 210 is sized and shaped for manual manipulation by a user. Numerous suitable shapes for body portion 210 will be apparent in light of this disclosure.

As can be seen further from FIGS. 7-11, extracting portion 200 also may include two arm portions 220 that extend from body portion 210. Arm portions 220 may extend from body portion 210 generally parallel to one another (e.g., within about 10° or less of divergence from one another in extending away from body portion 210), in accordance with some embodiments. Also, as can be seen from FIGS. 7-11, the end 222 (e.g., distal to body portion 210) of each arm portion 220 optionally may be chamfered to a given degree, in accordance with some embodiments. The angle of chamfering, when optionally included, may be customized, as desired. Alternatively (or additionally), end 222 may be provided with a given degree of rounding and/or faceting.

The geometry and dimensions of arm portions 220 may be customized, as desired. In accordance with some embodiments, a given arm portion 220 may be substantially linear (e.g., straight) in form. In some other embodiments, a given arm portion 220 may be substantially non-linear (e.g., curved and/or articulated) in form. In some cases, a given arm portion 220 may have a generally box-like shape of substantially square or rectangular cross-sectional geometry. In some other cases, a given arm portion 220 may have a generally cylindrical shape of substantially circular or elliptical cross-sectional geometry. In some cases, a given arm portion 220 may be substantially uniform in one or more dimensions along its length, whereas in some other cases, a given arm portion 220 may change in one or more dimensions along its length (e.g., may taper or expand in one or more directions).

Figure 8:
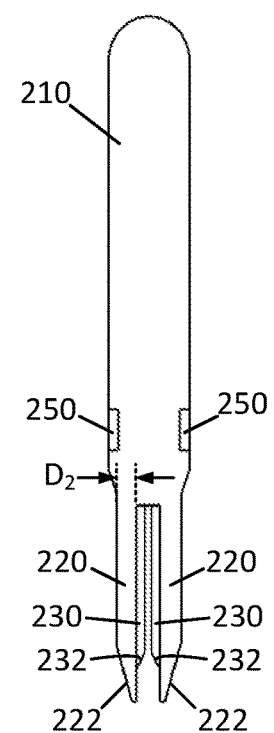
Figure 9:
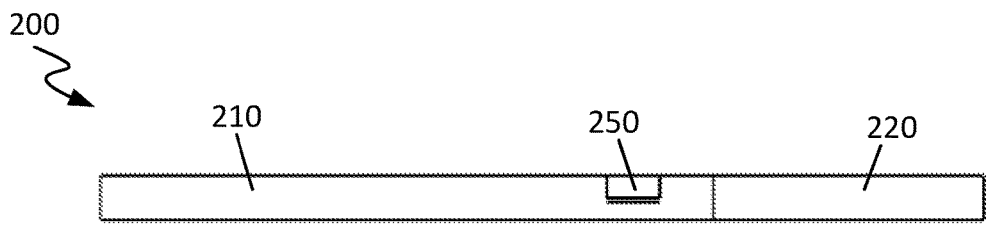
Figure 10:
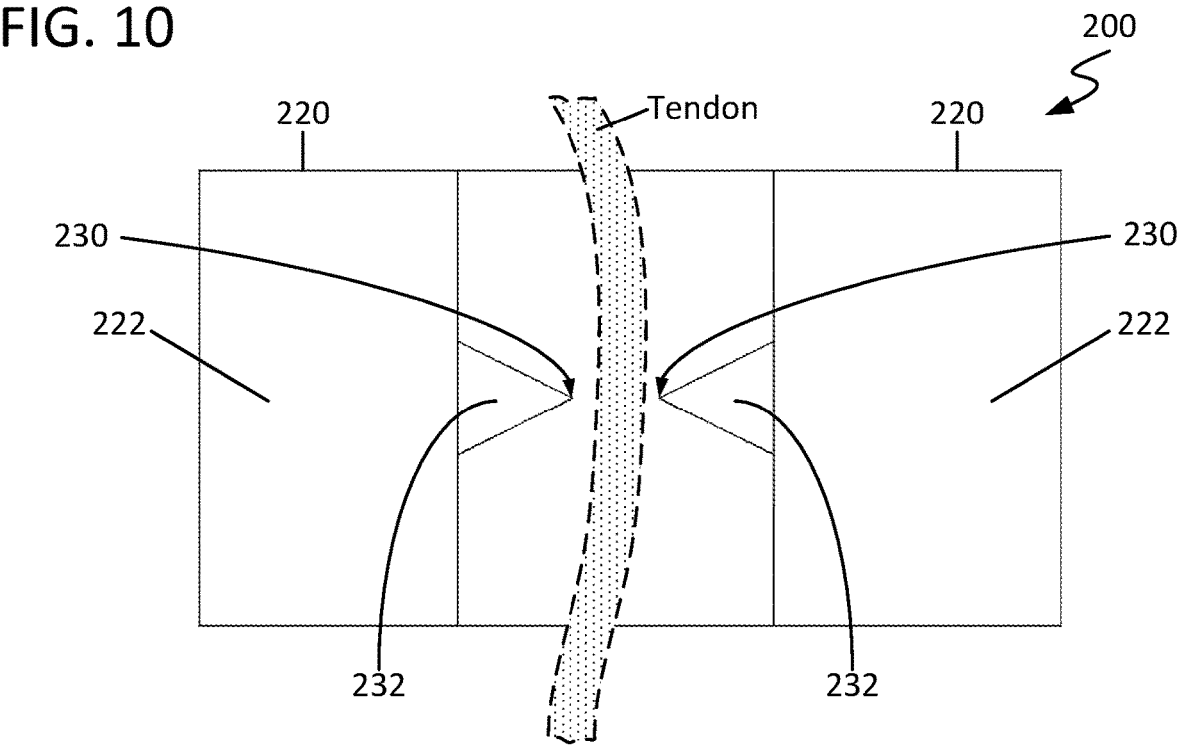
Figure 11:
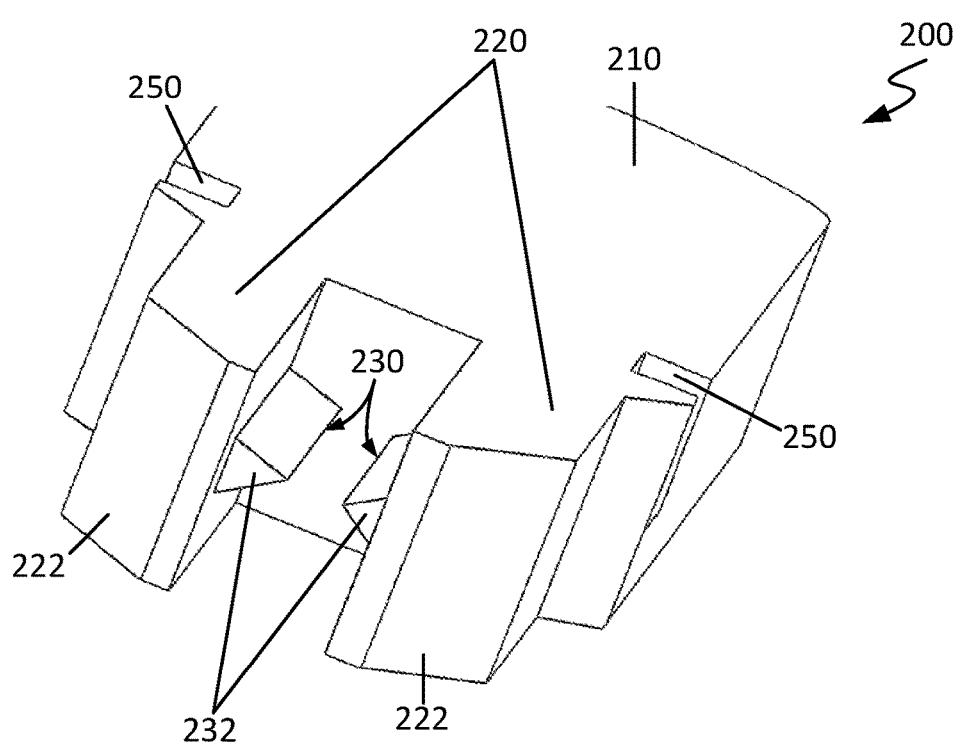

The relative positioning of arm portions 220 on or about body portion 210 may be customized, as desired. For instance, in some cases, arm portions 220 may be disposed at an end of body portion 210. In some instances, body portion 210 may transition directly to arm portions 220, as generally can be seen in FIG. 8. As will be appreciated in light of this disclosure, it generally may be desirable to ensure that the thickness (dimension $D_2$— see FIG. 8) of a given arm portion 220 is commensurate with a target degree of resilience and manipulability for extracting portion 200 (i.e., arm portion 220 is not so thick as to inhibit flexing and not so thin as to be fragile).

In accordance with some embodiments, each arm portion 220 further may include a cutting feature 230 (e.g., running along an interior surface thereof). In some cases, a given cutting feature 230 may be a feature having one or more edges of sufficient sharpness which is formed native to an associated arm portion 220 (e.g., arm portion 220 and its attendant cutting feature 230 may be of monolithic/single-piece construction). In some cases, a given cutting feature 230 may be a feature having one or more edges of sufficient sharpness which is separably attached to an associated arm portion 220 (e.g., arm portion 220 and its attendant cutting feature 230 may be of polylithic/multi-piece construction). In some embodiments, a given cutting feature 230 may be (or otherwise may include) one or more blades (e.g., razor blades) formed from a metal or alloy. In some cases, a given cutting feature 230 may be removable from its associated arm portion 220 and replaceable, in some instances helping to extend the operating life of extraction portion 200 (or device 1000 more generally).

The quantity and arrangement (e.g., pitch or spacing) of cutting features 230 may be customized, as desired. As can be seen from FIGS. 7-11, for example, cutting features 230 may be configured as two opposing cutting edges situated within the gap between arm portions 220. In some instances, cutting features 230 may be situated directly opposite one another, whereas in some other instances, one cutting feature 230 may be offset from the other cutting feature 230 in one or more directions. It should be noted, however, that the present disclosure is not intended to be so limited, as other quantities and configurations of cutting features 230 may be provided, in accordance with other embodiments.

The dimensions and geometry of a given cutting feature 230 may be customized, as desired. In some cases, a given cutting feature 230 may be substantially linear (e.g., straight) in form, whereas in some other cases, a given cutting feature 230 may be substantially non-linear (e.g., curved and/or articulated) in form. In some instances, a first portion of a given cutting feature 230 may be substantially linear, while a second portion thereof may be substantially non-linear.

As can be seen from FIGS. 7-11, for example, a given cutting feature 230 may have a generally triangular prism shape of substantially triangular cross-sectional geometry, in accordance with some embodiments. In such instances, the base and/or height of such triangular shape may be customized, as desired, resulting in a thicker/thinner and taller/shorter cutting feature 230 of a given target configuration. Also, as can be seen from FIGS. 7-11, the end 232 (e.g., distal to body portion 210) of a given cutting feature 230 optionally may be chamfered to a given degree, in accordance with some embodiments. The angle of chamfering, when optionally included, may be customized, as desired. Alternatively (or additionally), end 232 may be provided with a given degree of rounding and/or faceting.

In some cases, a given cutting feature 230 may be substantially uniform in one or more dimensions along its length. In some other cases, a given cutting feature 230 may change in one or more dimensions along its length (e.g., may taper or expand in one or more directions). In some cases, a given cutting feature 230 may be substantially continuous along its length (e.g., there are no gaps or interruptions in such cutting feature 230). In some other cases, a given cutting feature 230 may be discontinuous at one or more points along its length (e.g., there are one or more gaps or interruptions in such cutting feature 230). In some instances, a given cutting feature 230 optionally may be serrated, in part or in whole, along its length.

The relative positioning of a given cutting feature 230 on or about a given arm portion 220 may be customized, as desired. For instance, in some cases, a cutting feature 230 may extend from body portion 210 along an arm portion 220 and terminate somewhere along the length of that arm portion 220 (e.g., at end 222 or otherwise). In some cases, a cutting feature 230 may extend along an arm portion 220, in part or in whole, without any junction between such cutting feature 230 and body portion 210 (e.g., such cutting feature 230 is not integral to, abutting, or in contact with body portion 210).

In some cases, cutting features 230 may be substantially homogeneous in configuration. That is, all cutting features 230 may be substantially similar (e.g., identical or approximately identical) in configuration. In some other cases, cutting features 230 may be heterogeneous in configuration. That is, at least one cutting feature 230 may differ substantially from at least one other cutting feature 230 in one or more characteristics (e.g., geometry, contour, size, surface texture, faceting, etc.).

As noted above, extracting portion 200 may be configured, in accordance with some embodiments, to extract (e.g., by cutting or stripping away) a tendon situated between arm portions 220 and contacting cutting features 230. To that end, extracting portion 200 may be moved along the length of the tendon (or vice versa), and cutting features 230 may cut or sheer away the tendon, separating it from the raw meat. In accordance with some embodiments, pressure may be applied to arm portions 220 to deflect them inward toward one another, thereby causing cutting features 230 to converge on a tendon situated therebetween. The inward deflection of arm portion 220 generally may be temporary, lasting so long as sufficient pressure is applied or, in cases where extracting portion 200 is configured to be locked in a deflected state, until such locked state is ceased (e.g., arm portions 220 are unlocked). When the applied pressure ceases, arm portions 220 naturally may return to their undeflected state, causing arm portions 220 to separate from one another (e.g., causing cutting features 230 to disengage).

In accordance with some embodiments, device 1000 optionally may be configured such that gripping portion 100 and extracting portion 200 may be temporarily joined with one another (e.g., for ease of storage and retrieval when not in use). To that end, gripping portion 100 and extracting portion 200 respectively may include one or more interfacing features configured for multiple/repeated interfacing (e.g., attachment and detachment) thereof. For instance, consider FIG. 1. As can be seen, gripping portion 100 and extracting portion 200 may be configured, in accordance with some embodiments, to interface via snap-fit assembly of interfacing features (e.g., via a cantilever snap-fit arrangement). To that end, each arm portion 120 (of gripping portion 100) may include a tab feature 150 configured to interface with a corresponding receiver feature 250 (of extracting portion 200). As will be appreciated in light of this disclosure, in such snap-fit assembly, the protruding edge of tab feature 150 may be received and retained (e.g., in a temporary, repeatable manner) by the corresponding snap-in area of receiver feature 250. As will be further appreciated, in other instances, each arm portion 120 (of gripping portion 100) instead may include receiver feature(s) 250, and extracting portion 200 instead may include tab feature(s) 150.

It should be noted, however, that the present disclosure is not intended to be so limited only to a snap-fit assembly of gripping portion 100 and extracting portion 200. More specifically, in some embodiments, gripping portion 100 and extracting portion 200 alternatively (or additionally) may be configured to interface via magnetic assembly. In some such cases, each of gripping portion 100 and extracting portion 200 may have a magnet or a body of magnetic material, configured for magnetic attraction therebetween. In some other such cases, gripping portion 100 may have a magnet while extracting portion 200 may be at least partially constructed from a magnetic material (or vice versa). In some still other embodiments, gripping portion 100 and extracting portion 200 alternatively (or additionally) may be configured to interface via post-and-slot mating, with linear and/or rotational assembly being involved.

The material construction of device 1000 may be customized, as desired for a given target application or end-use. In accordance with some embodiments, device 1000 may be constructed, in part or in whole, from a polymer (e.g., a plastic) or composite material. In accordance with some embodiments, device 1000 may be constructed, in part or in whole, from a metal or alloy. In some cases, device 1000 may be constructed from material(s) which are sterilizable, food-grade, and/or dishwasher-safe. In accordance with some embodiments, device 1000 may be made, in part or in whole, from a rigid but resilient material (e.g., which provides for spring-like biasing). Either (or both) of gripping portion 100 and extracting portion 200 may be of monolithic construction (i.e., single-piece construction) or polylithic construction (i.e., multi-piece construction), as desired. In some cases, either (or both) of gripping portion 100 and extracting portion 200 may include one or more replaceable portions or features.

Returning to FIG. 6, for example, in some cases, gripping portion 100 optionally may include a recessed or notched area formed in a given arm portion 120 generally located beneath tab feature 150. A recessed/notched area may be provided in either or both arm portions 120. In at least some such cases, the presence of such optional feature may facilitate formation (e.g., by injection molding) of gripping portion 100. As will be appreciated in light of this disclosure, the degree of recessing, as well as the dimensions and geometry of such recessed/notched area, may be customized, as desired.

Methodology

As previously noted, device 1000 may be used in extracting (e.g., by cutting or stripping away) tendon(s) from a piece or cut of raw meat. More generally, extracting portion 200 may be configured to effectuate separation of an exposed tendon from surrounding tissue of the piece of raw meat, while gripping portion 100 may be configured to hold and/or maneuver the exposed tendon in the process of extraction. In accordance with some embodiments, device 1000 may be used in extracting tendon(s) from poultry (e.g., chicken) tenderloins. Other suitable uses for device 1000 will depend on a given target application or end-use and will be apparent in light of this disclosure.

In use of device 1000, gripping portion 100 may be operated to securely grip an exposed end of the tendon of a raw chicken tenderloin. In some instances, arm portions 120 may be deflected toward one another manually (e.g., by the hand of a user) to effectuate gripping of the tendon, though in some other instances, a separate tool, mechanism, or machine may be interfaced with gripping portion 100 to effectuate gripping. In some cases, gripping by gripping portion 100 may be provided for as long as sufficient force is applied to arm portions 120 of gripping portion 100. In some other cases, gripping by gripping portion 100 may be provided for as long as arm portions 120 are locked into a position that provides such gripping.

In use of device 1000, extracting portion 200 may be positioned relative to the raw chicken tenderloin such that the exposed end of the tendon extends between cutting features 230 (e.g., in the gap between arm portions 220). In some instances, arm portions 220 optionally may be deflected toward one another manually (e.g., by the hand of a user) to bring cutting features 230 into contact (or at least proximity) with the tendon, though in some other instances, a separate tool, mechanism, or machine optionally may be interfaced with extracting portion 200 to effectuate deflection of arm portions 220. In some cases, deflection may be provided for as long as sufficient force is applied to arm portions 220 of extracting portion 200. In some other cases, deflection may be provided for as long as arm portions 220 are locked into a position that provides such deflection.

In use of device 1000, extracting portion 200 may be maintained in a position proximate the raw chicken tenderloin while gripping portion 100, having securely gripped the tendon, is moved away (e.g., with a pulling or pushing motion) from extracting portion 200. Cutting features 230, thus, may cut or strip away the tendon from the meat as the tendon is maneuvered (e.g., pulled or pushed) using gripping portion 100. Alternatively, in use of device 1000, extracting portion 200 itself may be moved (e.g., slid or otherwise advanced) along the tendon while such tendon is securely gripped by gripping portion 100. Cutting features 230, thus, may cut or strip away the tendon from the meat as extracting portion 200 is maneuvered (e.g., pulled or pushed) relative to the raw chicken tenderloin. As will be appreciated in light of this disclosure, positioning and maneuvering of gripping portion 100, extracting portion 200, the tendon, and/or the raw chicken tenderloin may be provided manually (e.g., by the hand of a user) or by a separate tool, mechanism, or machine interfaced therewith and may be done in any suitable order, in accordance with various embodiments.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description. Future-filed applications claiming priority to this application may claim the disclosed subject matter in a different manner and generally may include any set of one or more limitations as variously disclosed or otherwise demonstrated herein.

What is claimed is:

1. A tendon extraction device comprising:
   a gripping portion configured to grip an exposed tendon of a piece of raw meat, the gripping portion comprising:
      a first body portion;
      a first arm portion extending from the first body portion; and
      a second arm portion extending from the first body portion adjacent the first arm portion;
      wherein at least one of the first arm portion and the second arm portion has a toothed region configured to contact the exposed tendon in operation of the gripping portion; and
   an extracting portion configured to extract the exposed tendon from the piece of raw meat, the extracting portion comprising:
      a second body portion;
      a third arm portion extending from the second body portion; and
      a fourth arm portion extending from the second body portion adjacent the third arm portion;
      wherein at least one of the third arm portion and the fourth arm portion has a cutting feature including one or more sharp edges configured to contact the exposed tendon to effectuate separation of the exposed tendon via the cutting feature from surrounding tissue of the piece of raw meat in operation of the extracting portion; and
      wherein in operation of the tendon extraction device, the exposed tendon extends at least in part between the third arm portion and the fourth arm portion of the extracting portion.

2. The tendon extraction device of claim 1, wherein the toothed region is disposed at an end of the at least one of the first arm portion and the second arm portion which is distal to the first body portion.

3. The tendon extraction device of claim 1, wherein the first arm portion and the second arm portion have respective toothed regions.

4. The tendon extraction device of claim 3, wherein the respective toothed regions are disposed at respective ends of the first arm portion and the second arm portion.

5. The tendon extraction device of claim 3, wherein the respective toothed regions of the first arm portion and the second arm portion are configured to interface with one another in a complementary manner.

6. The tendon extraction device of claim 1, wherein the first arm portion and the second arm portion are substantially parallel to one another.

7. The tendon extraction device of claim 1, wherein the first arm portion and the second arm portion have respective pressing pads configured to have pressure applied thereto in operation of the gripping portion.

8. The tendon extraction device of claim 7, wherein the respective pressing pads are disposed at respective ends of the first arm portion and the second arm portion.

9. The tendon extraction device of claim 1, wherein the cutting feature extends along at least a partial length of the at least one of the third arm portion and the fourth arm portion.

10. The tendon extraction device of claim 1, wherein the third arm portion and the fourth arm portion have respective cutting features.

11. The tendon extraction device of claim 10, wherein the respective cutting features extend along at least a partial length of the third arm portion and the fourth arm portion, respectively.

12. The tendon extraction device of claim 10, wherein the respective cutting features of the third arm portion and the fourth arm portion have a generally triangular prism shape of substantially triangular cross-sectional geometry.

13. The tendon extraction device of claim 10, wherein the respective cutting features of the third arm portion and the fourth arm portion are chamfered at respective ends thereof.

14. The tendon extraction device of claim 1, wherein the third arm portion and the fourth arm portion are substantially parallel to one another.

15. The tendon extraction device of claim 1, wherein at least one of the gripping portion and the extracting portion is configured to be held in a hand of a user of the tendon extraction device.

16. The tendon extraction device of claim 1, wherein the gripping portion and the extracting portion are configured to interface with one another in joined fashion when the tendon extraction device is not in use.

17. The tendon extraction device of claim 16, wherein the gripping portion and the extracting portion are configured to interface with one another via snap-fit assembly thereof.

18. The tendon extraction device of claim 17, wherein for providing such snap-fit assembly:
   the gripping portion includes at least one tab feature; and
   the extracting portion includes at least one receiver feature configured to receive and retain the at least one tab feature of the gripping portion.

19. The tendon extraction device of claim 1, wherein the piece of raw meat comprises a portion of a chicken breast.

20. The tendon extraction device of claim 19, wherein the portion of the chicken breast comprises a chicken tenderloin.

* * * * *